CHAMBERLIN & CLAWSON.
Rake Attachment for Reapers.
No. 98,557.
Patented Jan'y 4, 1870.
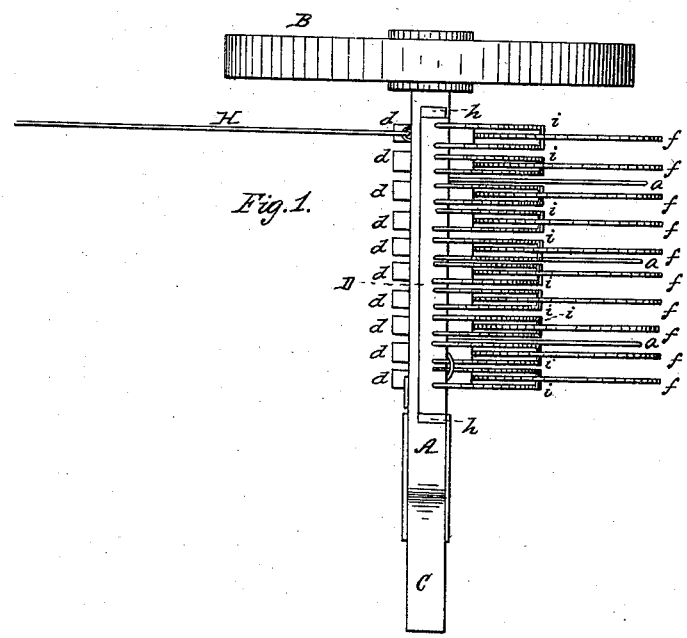
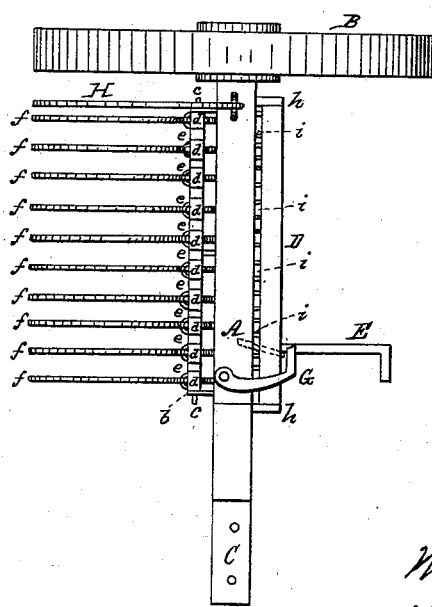
Witnesses:
Inventors:

UNITED STATES PATENT OFFICE.

M. C. CHAMBERLIN AND A. CLAWSON, OF PLAINVIEW, MINNESOTA.

IMPROVED RAKE ATTACHMENTS FOR REAPERS.

Specification forming part of Letters Patent No. 98,557, dated January 4, 1870.

*To all whom it may concern:*

Be it known that we, M. C. CHAMBERLIN and A. CLAWSON, of Plainview, in the county of Wabashaw, and in the State of Minnesota, have invented certain new and useful Improvements in Gleaner or Rake Attachment for Reapers; and do hereby declare that the following is a full, clear, and exact description thereof, reference being had to the accompanying drawings, and to the letters of reference marked thereon, making a part of this specification.

The nature of our invention consists in the arrangement, in connection with a reaper, of a gleaner or rake, for the purpose of raking or collecting the stubble and loose grain left on the ground by the reaper; also, in the construction of such gleaner or rake attachment.

In order to enable others skilled in the art to which our invention appertains to make and use the same, we will now proceed to describe its construction and operation, referring to the annexed drawings, in which—

Figure 1 is a plan view, and Fig. 2 a rear view, of our gleaner or rake attachment.

A represents the axle of the machine, provided at one end with a wheel, B, and at the other end a piece, C, is hinged. This piece is bolted or otherwise firmly secured to the frame of a reaper, on the side opposite to that on which the cutter-bar is placed. From the rear side of the axle A extend straight rods $a\ a$, and on its under side are ears $h\ h$ through which a rod, $c$, is passed. On the rod $c$ are a series of blocks, $d\ d$, to which the rake-teeth $f f$ are secured, the blocks $d\ d$ being separated by means of smaller blocks $e\ e$, through which the rod $c$ also passes. In ears $h\ h$, on top of the axle A, is pivoted a shaft, D, which is provided with a series of loops, $i\ i$, of the same number as there are rake-teeth, said teeth passing through the loops. The shaft D is turned by means of a lever, E, secured to the shaft at such a point that the driver on the reaper to which our gleaner is attached can move it with his foot, and thus raise the rake-teeth up from the ground. A hook, G, holds the lever E, so that the teeth will not fall back until desired. The gleaner is further connected with the reaper by means of a rod, H, attached to the axle A near the wheel B, and to any convenient point on the reaper.

The length of the axle A should be the same as the length of the cutter-bar, so that the rake will collect the stubble, scatterings, or loose grain left by the reaper the time before.

Having thus fully described our invention, what we claim as new, and desire to secure by Letters Patent, is—

1. The arrangement of the axle A, wheel B, hinged piece C, and rod H, for connection of the rake or gleaner to a reaper, substantially as herein set forth.

2. The combination and arrangement of the axle A, rods $a\ a$, blocks $d\ d$ and $e\ e$, teeth $f f$, shaft D, loops $i\ i$, lever E, and hook H, all substantially as and for the purposes herein set forth.

In testimony that we claim the foregoing we have hereunto set our hands and seals this 7th day of October, 1869.

M. C. CHAMBERLIN. [L. S.]
A. CLAWSON. [L. S.]

Witnesses:
H. P. WILLSON,
D. E. MYERS.